United States Patent

[15] 3,659,991

Diamond

[45] May 2, 1972

[54] CLAMPING FRAME FOR PLASTIC VACUUM FORMING MACHINE

[72] Inventor: Harvey J. Diamond, Charlotte, N.C.

[73] Assignee: Plasti-Vac, Inc., Charlotte, N.C.

[22] Filed: Apr. 3, 1970

[21] Appl. No.: 25,349

[52] U.S. Cl. ..............................425/174, 269/55, 425/397, 425/388
[51] Int. Cl. ..........................................B29c 17/04
[58] Field of Search................18/1 FB, 19 D, 19 F, 19 N, 18/19 P, 19 R, 47 C, DIG. 48

[56] References Cited

UNITED STATES PATENTS

| 3,133,314 | 5/1964 | Arnould et al. | 18/19 F |
| 2,680,882 | 6/1954 | Hirschmann et al. | 18/19 P X |
| 2,879,617 | 3/1959 | Popeil | 18/47 C X |
| 3,058,154 | 10/1962 | Howard et al. | 18/19 P X |
| 3,196,488 | 7/1965 | Jones-Hinton et al. | 18/19 F |
| 3,305,889 | 2/1967 | Lewis et al. | 18/1 FB |
| 3,516,122 | 6/1970 | Schwartz | 18/19 F |

OTHER PUBLICATIONS 1,110,855 July, 1961 German Specification (Behringer) 18/19P.

Primary Examiner—J. Spencer Overholser
Assistant Examiner—Donald M. Gurley
Attorney—Parrott, Bell, Seltzer, Park & Gibson

[57] ABSTRACT

A clamping frame for a plastic vacuum forming machine which includes upper and lower clamping members connected by hinges for supporting a plastic sheet during the heating and forming operations and which are constructed to facilitate the clamping of the plastic sheet. Also, a substantial portion of the surface of at least one of the clamping members is coated with a heat absorbing material such that its temperature rises to a higher level than would otherwise be the case.

5 Claims, 4 Drawing Figures

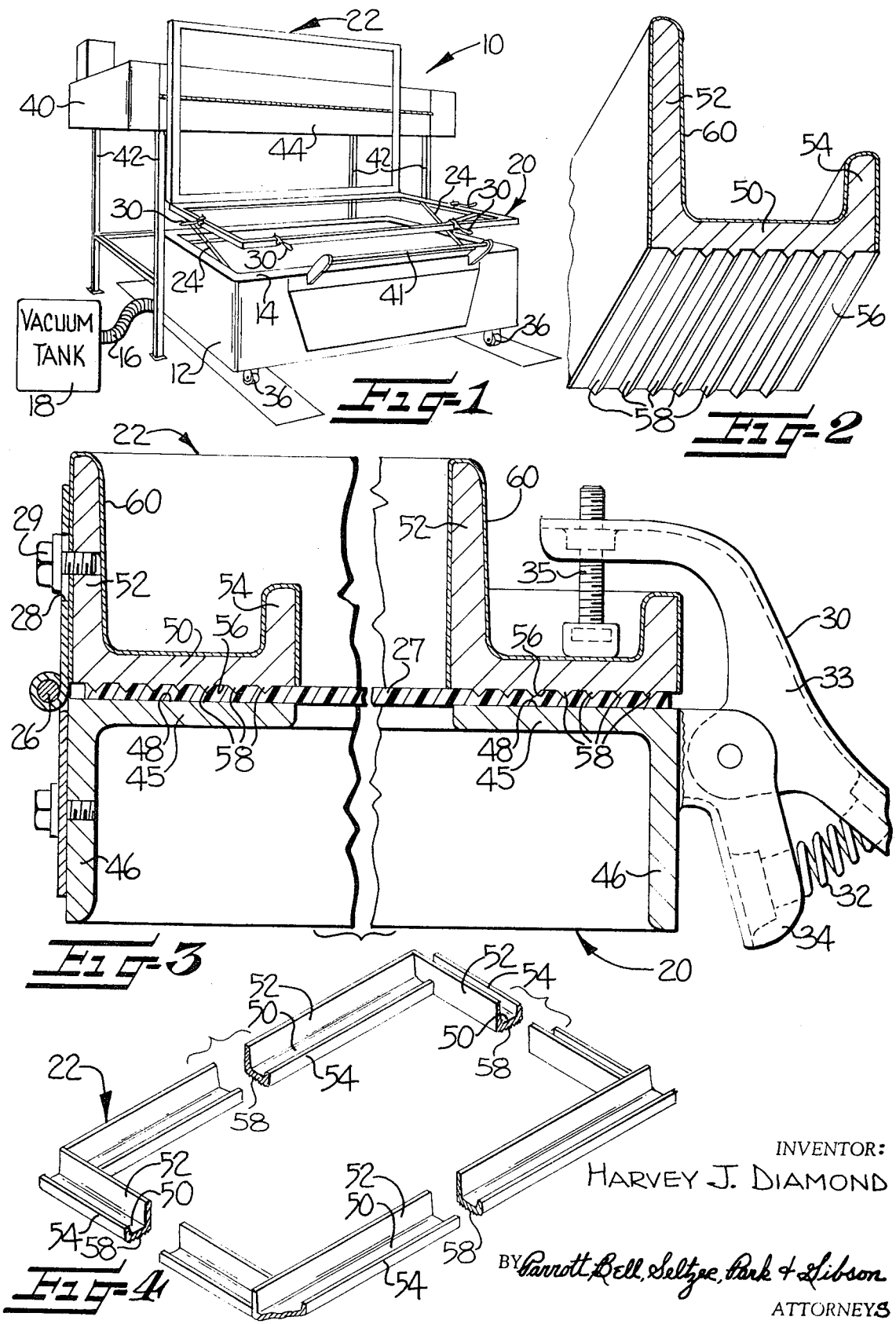

CLAMPING FRAME FOR PLASTIC VACUUM FORMING MACHINE

The present invention relates to a clamping frame for supporting a sheet of thermoplastic material during the various operations of a vacuum forming process. More particularly, the invention is directed to a strong, lightweight, easily used clamping frame for supporting a sheet of plastic during a vacuum forming process and in a manner such that the peripheral edges of the sheet will not be subject to deformation or warpage.

In a conventional vacuum process, a sheet of thermoplastic material is supported by a clamping frame extending around the periphery thereof and having opposed clamping faces. One of the clamping faces usually has adjustable screws or the like extending outwardly from the face at relatively widely spaced intervals to penetrate into and grip the sheet of plastic. However, when the plastic is positioned adjacent a heating apparatus such that the material is heated and softened, and a vacuum is drawn thereon from below a die such that the plastic material is formed into a corresponding shape, the plastic sheet warps or forms unevenly around the peripheral edges due to the widely spaced clamping points. Also, the adjustment of the screws takes a considerable time and reduces the efficiency of the machine.

Warpage of the peripheral edges of the plastic sheet also apparently results in part from the fact that the peripheral edges are maintained at a lower temperature during the heating and molding operations than is the midportion of the sheet. Since the peripheral edges are positioned between the clamping members, and since the clamping members do not rise to the same temperature as the midportion of the sheet, a temperature gradient along the edges will result. This gradient is believed to contribute to the warpage of the edges upon cooling of the sheet.

It is accordingly an object of the present invention to provide a clamping frame for retaining a sheet of thermoplastic material during the various processes of a vacuum forming operation, and which is designed to avoid the problem of deformation or warpage.

It is another object of this invention to provide a clamping frame which includes a surface coating for increasing the heat absorption of the frame during the heating operation and for decreasing its rate of cooling upon removal from the heating apparatus such that the peripheral edges of the sheet are raised to a somewhat higher temperature than would otherwise be the case.

It is a further object of this invention to provide a clamping frame of the described type which is lightweight yet strong in construction, is adjustable to varying thicknesses of the plastic sheet, and which includes a serrated surface for firmly gripping the plastic sheet.

These and other objects and advantages of the present invention are achieved in the embodiment illustrated herein by the provision of a clamping frame which comprises a lower rectangular clamping member having a substantially planar upper clamping face, and an upper rectangular clamping member hingedly mounted along one side edge of the bottom clamping member so that it may be swung open to admit the plastic sheet and closed to firmly retain the sheet therebetween. The upper clamping member includes a lower edge surface adapted to overlie the planar upper clamping face of the lower clamping member, and a coating of the heat absorbing material overlies a substantial portion of the surface of the upper clamping frame to increase the heat absorbency of this portion of the frame. The lower edge surface of the upper clamping member includes a plurality of longitudinally extending, substantially continuous serrations for gripping the plastic sheet.

Some of the objects of the invention having been stated, other objects will appear as the description proceeds, when taken in connection with the accompanying drawings, in which FIG. 1 is a perspective view of a vacuum forming machine incorporating the teachings of the present invention;

FIG. 2 is a fragmentary and sectioned perspective view of the upper clamping member of the present invention;

FIG. 3 is a sectional side view of the clamping frame shown in its closed position; and FIG. 4 is a perspective view illustrating the structural configuration of the upper clamping member.

A vacuum forming machine embodying the teachings of the present invention is shown generally at 10 in FIG. 1. The main components of the machine include a vacuum table 12 having a horizontal upper surface 14 for supporting a suitable mold or die (not shown) and which is adapted to be partially evacuated through a tube 16 leading to a suitable vacuum tank 18. The table 12 carries a clamping frame which includes a lower clamping member 20 and an upper clamping member 22. The lower member 20 is supported in a horizontal position by the collapsible crossbars 24 located at each side of the table such that the member 20 may be lifted and lowered while maintaining its horizontal positioning. It will be understood that various electrical controls (not shown) of conventional design may be utilized to close and open the crossbars 24 and thereby lift and lower the member 20.

The upper and lower clamping members are connected by one or more hinges 26 along the rear edge (note FIG. 3) so that the upper member 22 may be swung open to the position indicated in FIG. 1 to admit a sheet of plastic 27 therebetween. The hinges 26 include a slotted opening at 28 to admit the bolt 29 and thereby permit adjustment of the relative spacing between the two members, so that plastic sheets of varying thicknesses may be accommodated.

A plurality of hand operated clamps 30 are carried by the lower clamping member 20 to firmly close the two members together and thereby securely retain the plastic sheet 27. In the embodiment shown, the clamps are spaced along the periphery of the three unconnected sides of the two members, and each comprises a spring 32 acting between a pivotable arm 33 and a fixed arm 34 for pressing the vertical member 35 downwardly into engagement with the upper surface of the member 22. Obviously, many similar designs for the clamps could be employed, and they could be designed so as to be entirely removable from the lower member 20.

The table 12 is mounted on rollers 36 such that it may be rolled under the heating apparatus 40. To facilitate manual movement of the table, a front handle 41 may be attached thereto. The heating apparatus 40 is mounted on four corner posts 42 so as to be positioned above the table when it is rolled rearwardly as shown in FIG. 1. The heating apparatus preferably includes a downwardly directed electrical heating element (not shown), but other suitable heating means, such as gas or steam, could be employed. The front side of the heating apparatus includes a hinged flap 44 for the purposes hereinafter described.

The construction of the upper and lower clamping members of the clamping frame is shown in detail in FIGS. 2 – 4. The lower member 20 comprises a strong, lightweight material such as extruded aluminum, and has a right angled cross-sectional configuration comprising a horizontal arm 45 and a vertical arm 46. The upper surface of the horizontal arm 45 presents a rectangular and substantially planar upper clamping face 48. The upper clamping member 22 is of similar construction, but has modified cross-sectional configuration comprising a horizontal arm 50, a first integral vertical flange 52, and a second integral upstanding flange 54 parallel to and spaced from the first flange 52 to reinforce the clamping member. In addition, the upper clamping member 22 includes a downwardly directed clamping face 56 which is adapted to directly overlie the upper clamping face 48 when the two members are closed. The downwardly directed face preferably includes a plurality of serrations to tightly grip the retained plastic sheet, and which in the illustrated embodiment take the form of a plurality of longitudinally extending continuous sharpened ridges 58. The surface of the upper clamping member other than the downwardly directed face 56 is coated with a heat absorbing material 60, such as black paint.

In operation, the die is first placed centrally on the upper horizontal surface 14 of the vacuum table 12. With the clamping frame positioned vertically somewhat above the die, the upper member 22 is swung rearwardly to the position shown, and a sheet of thermoplastic material is positioned to overlie the lower member 20. By design, the peripheral edges of the plastic sheet will overlie and rest upon the upper face 48 of the lower member. The upper member is then closed and the clamps 30 engaged to firmly retain the plastic therebetween. Next, the oven flap 44 is opened, and the frame lifted to an extended position by the cross members 24. The table and extended frame are then rolled into the oven and flap 44 closed such that the clamping frame is virtually enclosed by the oven. After a predetermined heating interval (typically about three minutes) the frame is lowered until the outer periphery of the plastic is brought below the level of the die. The table 12 is then evacuated by opening a suitable valve (not shown) to the tank 18 to cause the plastic to be drawn into contact with the die. After cooling, the clamping frame is raised to release the plastic from the die, and the upper member 22 is swung rearwardly so that the molded plastic part may be removed from the table.

The presence of the heat absorbing material 60 has been found to raise the temperature of the upper clamping member 22 during the heating process and to limit its temperature drop during periods when the clamping frame is removed from the heating apparatus. Thus the temperature of the peripheral edge portion of the sheet 27 which is in contact with the lower face 56 is above that which would be the case in the absence of the material 60, and there is less temperature gradient between the midportion and edges of the sheet during heating and forming. This fact in turn eliminates or at least substantially reduces the tendency of the edges to warp upon cooling.

The ridges 58 in the lower clamping face 56 provide a broad, continuous area of engagement with the plastic sheet. Thus upon heating, the softened plastic is firmly supported along its entire periphery, and there is no opportunity for lateral flowing of the plastic to cause undulations and deformation.

In the drawings and specification there has been set forth a preferred embodiment of the invention, and although specific terms are employed, they are used in a generic and descriptive sense only and not for purposes of limitation:

What is claimed is:

1. In a vacuum forming machine for molding a thermoplastic sheet about a suitable die and including a vacuum table adapted to support a die thereon and heating means positioned above said table and defining an oven into which the plastic sheet is received for heating prior to forming, the improvement comprising clamping frame means for securely supporting a sheet of plastic during heating and forming comprising
   a lower rectangular clamping member having a substantially continuous and planar upper clamping face,
   an upper rectangular clamping member having a substantially continuous lower clamping face and being mounted for movement relative to the lower clamping member between an open position to admit a plastic sheet therebetween and a closed position to grip and retain the peripheral edge of the sheet between said clamping faces,
   a plurality of parallel, elongate ridges carried by one of said clamping faces and extending longitudinally of and substantially continuously throughout the longitudinal extent of said one of the clamping faces to substantially continuously grip the plastic sheet around its peripheral edge,
   a coating of heat-absorbent material covering a substantial portion of the exposed surface of said upper clamping member to increase the heat transfer to the plastic sheet through the clamping frame member,
   means for lifting said clamping frame into close proximity to said heating apparatus such that a supported plastic sheet may be heated, and for lowering said frame into close proximity to said vacuum table such that a supported sheet will contact a die positioned on said vacuum table, and
   vacuum means operatively associated with said vacuum table for drawing a supported plastic sheet onto a die positioned on said vacuum table.

2. The clamping frame as defined in claim 1 further comprising means for pressing the upper clamping member against the lower clamping member to firmly close the two members.

3. The clamping frame as defined in claim 2 wherein said heat absorbing material comprises black paint on said upper clamping member.

4. The vacuum forming machine as defined in claim 1 wherein said upper clamping member includes a first integral flange extending in a direction substantially perpendicular to said lower clamping face and a second integral flange parallel to and spaced from said first integral flange, said first and second flanges thereby serving to reinforce the upper clamping member.

5. The vacuum forming machine as defined in claim 4 wherein said upper clamping member is hingedly mounted along one side edge of said lower clamping member, said mounting being adjustable to accommodate plastic sheets of varying thickness therebetween.

* * * * *